United States Patent
Chen et al.

(10) Patent No.: US 11,069,084 B2
(45) Date of Patent: Jul. 20, 2021

(54) OBJECT IDENTIFICATION METHOD AND DEVICE

(71) Applicant: INDUSTRIAL TECHNOLOGY RESEARCH INSTITUTE, Hsinchu (TW)

(72) Inventors: Hsin-Yi Chen, Hsinchu (TW); Chia-Liang Yeh, Taoyuan (TW); Hsin-Cheng Lin, Hemei Township (TW); Sen-Yih Chou, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 81 days.

(21) Appl. No.: 16/231,701

(22) Filed: Dec. 24, 2018

(65) Prior Publication Data

US 2020/0167952 A1 May 28, 2020

(30) Foreign Application Priority Data

Nov. 26, 2018 (TW) .................... 107142083

(51) Int. Cl.
G06T 7/73 (2017.01)
G06T 7/90 (2017.01)

(52) U.S. Cl.
CPC .............. *G06T 7/74* (2017.01); *G06T 7/90* (2017.01); *G06T 2207/20081* (2013.01)

(58) Field of Classification Search
CPC .... G06T 2207/20081; G06T 7/74; G06T 7/90
See application file for complete search history.

(56) References Cited

U.S. PATENT DOCUMENTS

| | | | |
|---|---|---|---|
| 4,900,144 | A | 2/1990 | Kobayashi |
| 5,793,900 | A | 8/1998 | Nourbakhsh et al. |
| 7,366,325 | B2 | 4/2008 | Fujimura et al. |
| 9,116,101 | B2 | 8/2015 | Chen et al. |
| 9,131,148 | B2 | 9/2015 | Suzuki et al. |
| 9,400,503 | B2 | 7/2016 | Kearns et al. |

(Continued)

FOREIGN PATENT DOCUMENTS

| | | |
|---|---|---|
| CN | 105141889 A | 12/2015 |
| CN | 106529527 A | 3/2017 |

(Continued)

OTHER PUBLICATIONS

Deng et al., "Amodal Detection of 3D Objects: Inferring 3D Bounding Boxes from 2D Ones in RGB-Depth Images", 2017 IEEE Conference on Computer Vision and Pattern Recognition, 2017, pp. 398-406 (9 pages).

(Continued)

*Primary Examiner* — Kenny A Cese

(74) *Attorney, Agent, or Firm* — Birch, Stewart, Kolasch & Birch, LLP

(57) ABSTRACT

An object identification method includes: establishing a training data base including a photographing distance of a training image and a training camera parameter; in photographing a target test object, obtaining a test image, a depth image, an RGB image and a test camera parameter; and based on the training database, the depth image and the test camera parameter, adjusting the RGB image wherein the adjusted RGB image having a size equivalent to the training image of the training database.

6 Claims, 3 Drawing Sheets

(56) References Cited

U.S. PATENT DOCUMENTS

| | | | |
|---|---|---|---|
| 9,530,060 B2 | 12/2016 | Zhang et al. | |
| 9,541,640 B2 | 1/2017 | Hall et al. | |
| 9,552,514 B2 | 1/2017 | Zhao et al. | |
| 9,672,634 B2 | 6/2017 | Luczak et al. | |
| 9,740,937 B2 | 8/2017 | Zhang et al. | |
| 9,835,725 B2 | 12/2017 | Leuker et al. | |
| 9,848,112 B2 | 12/2017 | Piekniewski et al. | |
| 9,865,083 B2 | 1/2018 | Chen et al. | |
| 9,886,773 B2 | 2/2018 | Uchida et al. | |
| 9,963,246 B2 | 5/2018 | Harris et al. | |
| 9,972,091 B2 | 5/2018 | Lee et al. | |
| 9,973,741 B2 | 5/2018 | Holz | |
| 10,311,311 B1* | 6/2019 | Wang | G06K 9/4642 |
| 2004/0004614 A1 | 1/2004 | Bacus et al. | |
| 2008/0292151 A1* | 11/2008 | Kurtz | A61B 5/445 |
| | | | 382/128 |
| 2016/0148079 A1* | 5/2016 | Shen | G06N 3/0454 |
| | | | 382/157 |
| 2017/0132769 A1* | 5/2017 | Barron | G06K 9/6215 |
| 2018/0068198 A1 | 3/2018 | Savvides et al. | |
| 2019/0080795 A1* | 3/2019 | Sanghavi | G06T 7/0012 |
| 2019/0304105 A1* | 10/2019 | Gao | G06K 9/4642 |

FOREIGN PATENT DOCUMENTS

| | | |
|---|---|---|
| CN | 107157717 A | 9/2017 |
| TW | 201734955 A | 10/2017 |
| TW | I624806 B | 5/2018 |

OTHER PUBLICATIONS

Gupta et al., "Learning Rich Features from RGB-D Images for Object Detection and Segmentation", Jul. 22, 2014, pp. 1-16.

Panda et al., "Learning support order for manipulation in clutter", Conference Paper, IEEE/RSJ International Conference on Intelligent Robots and Systems. IEEE/RSJ international Conference on Intelligent Intelligent Robots and Sytems, Nov. 2013, 8 pages.

Xu et al., "Muti-modal deep feature learning for RGB-D object detection", Pattern Recognition, vol. 72, 2017 (available online Jul. 29, 2017), pp. 300-313 (14 pages).

* cited by examiner

OBJECT IDENTIFICATION METHOD AND DEVICE

This application claims the benefit of Taiwan application Serial No. 107142083, filed Nov. 26, 2018, the disclosure of which is incorporated by reference herein in its entirety.

TECHNICAL FIELD

The disclosure relates in general to an object identification method and a device thereof.

BACKGROUND

The technology of object identification using image learning has attracted more and more attention. Object identification can be used in application fields such as automated optical inspection (AOI), unmanned vehicle, unmanned retail store, or social security monitor.

Let the current application of object detection/identification be taken for example. During the training stage, a training image along with its training distance are obtained and stored in a database. Then, feature comparison is performed for detecting/identifying an object. If the difference between the test distance and the training distance is small, the difference will not have significant influence on the accuracy of object detection/identification.

However, if the difference between the test distance and the training distance is too large and the database has not been established completely, the identification rate may deteriorate.

Currently, two methods are available for increasing the identification rate. The first method is to establish a large database storing many training distances. Although the first method provides a higher accuracy, the establishment of database takes time. The second method is to simulate various sizes/angle/distance of the object beforehand. Although the second method does not need to establish a large database, the accuracy is low and a large volume of data needs to be simulated.

Therefore, it has become a prominent task for the industries to provide an object identification method capable of increasing identification accuracy without having to establish a large database beforehand.

SUMMARY

According to one embodiment, an object identification method is provided. The method includes the following steps. A training database including a photographing distance of a training image and a training camera parameter is established. A test image, a depth image, an RGB image, and a test camera parameter are obtained during the photographing of a target test object. The RGB image is adjusted according to the training database, the depth image, and the test camera parameter, such that the adjusted RGB image has a size equivalent to that of the training image in the training database.

According to another embodiment, an object identification device is provided. The object identification device includes a database module, a controller, and an identification module. The database module establishes a training database including a photographing distance of a training image and a training camera parameter. The controller obtains a test image, a depth image, an RGB image, and a test camera parameter during the photographing of a target test object. The identification module adjusts the RGB image according to the training database, the depth image, and the test camera parameter, such that the adjusted RGB image has a size equivalent to that of the training image in the training database.

The above and other aspects of the invention will become better understood with regard to the following detailed description of the preferred but non-limiting embodiment(s). The following description is made with reference to the accompanying drawings.

DETAILED DESCRIPTION

Technical terms are used in the specification with reference to generally-known terminologies used in the technology field. For any terms described or defined in the specification, the descriptions and definitions in the specification shall prevail. Each embodiment of the present disclosure has one or more technical characteristics. Given that each embodiment is implementable, a person ordinarily skilled in the art can selectively implement or combine some or all of the technical characteristics of any embodiment of the present disclosure.

Figure 1:
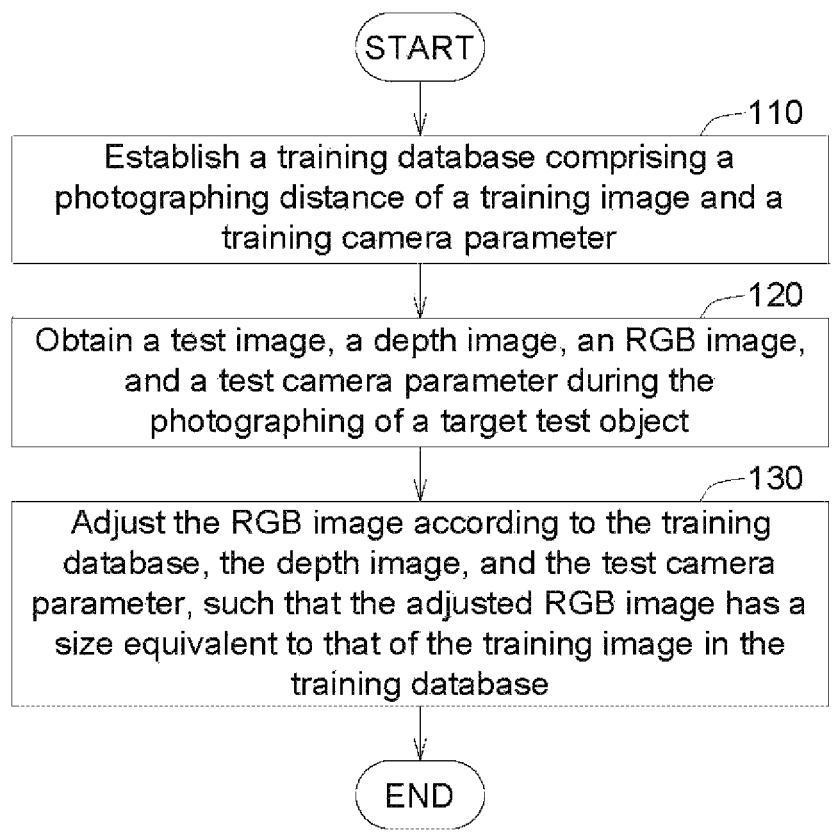
FIG. 1 is a flowchart of an object identification method according to an embodiment of the present disclosure.

FIG. 1 is a flowchart of an object identification method according to an embodiment of the present disclosure. In step 110, a training database including a photographing distance of a training image and a training camera parameter is established. The photographing distance of the training image refers to the distance from the training object to the training camera (this parameter can be obtained from the depth parameter of the training image). The training image refers to the image obtained by photographing the training object using the training camera. The training camera parameter refers to the camera parameter used for photographing the training image. The training camera parameter includes any combinations of focal length parameter, magnification power, and camera resolution.

In step 120, a test image, a depth image, an RGB image, and a test camera parameter are obtained during the photographing of a target test object. The depth image includes a depth information of the target test object. In an embodiment of the present disclosure, the depth information of the target test object may be generated by the test camera or generated by the user measuring the depth information of the target test object using a measurement tool (such as a ruler). The RGB image includes the R/G/B gray scale value of each pixel of the image of the target test object photographed using the test camera. The test camera parameter refers to the parameter of the test camera used for photographing the target test object. Similarly, the test camera parameter includes any combinations of focal length parameter, magnification power, and camera resolution.

In step 130, the RGB image is adjusted according to the training database, the depth image, and the test camera parameter, such that the adjusted RGB image has a size equivalent to that of a relevant training image in the training database.

In another embodiment of the present disclosure, the scaling of the test image is determined according to the photographing distance of the test image, the photographing distance of the training image, and the training camera parameter. The scaled test image is divided into a plurality of test sub-images each having a size equivalent to that of the relevant training image in the training database. Object identification is performed on the test sub-images.

In another possible embodiment of the present disclosure, a plurality of candidate regions including a plurality of object features are generated from the test image. After the candidate regions are generated, each candidate region is scaled individually with reference to the average distance of all objects within each candidate region, wherein each scaled candidate region has a size equivalent to that of the relevant training image in the training database. Object identification is performed on each scaled candidate region.

Detailed descriptions of some embodiments of the present disclosure are disclosed below.

First Embodiment: Pre-Treatment

Figure 2A:
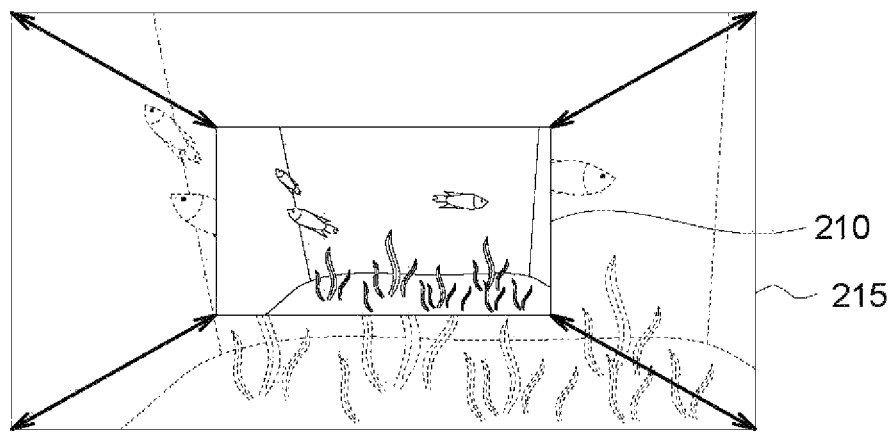
FIGS. 2A-2C are schematic diagrams of object identification according to a first embodiment of the present disclosure.
Figure 2B:
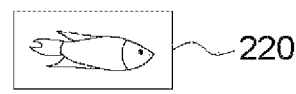

In the first embodiment of the present disclosure, the scaling of the entire test image 210 (as indicated in FIG. 2A) is determined according to the photographing distance of the test image, the photographing distance of the training image 220 (as indicated in FIG. 2B) and the test camera parameter. As indicated in FIG. 2A, the test image 210 is scaled as a scaled test image 215.

Figure 2C:
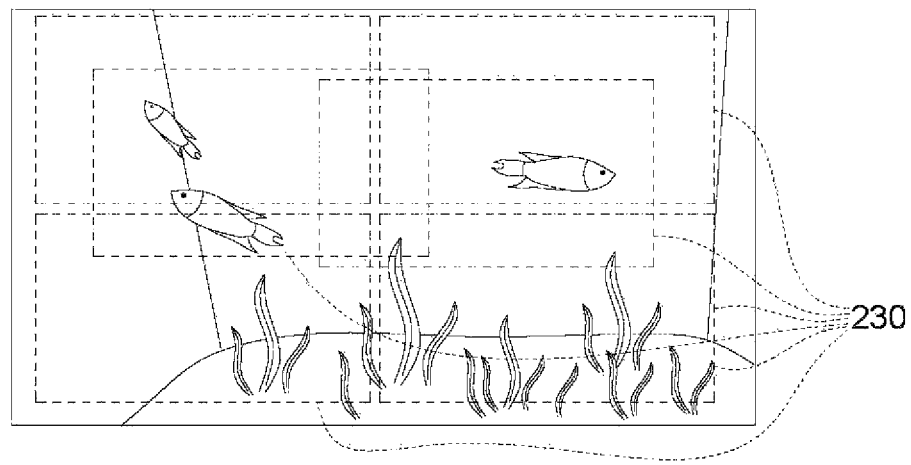

Then, the scaled test image 215 is divided into a plurality of test sub-images 230 (as indicated in FIG. 2C), and the size of each test sub-image 230 (such as the quantity of pixels, or the height and the width of the image) is equivalent to that of the training image 220. Then, object identification is performed on each test sub-image 230 to determine whether the training image 220 appears in each test sub-image 230. In the present embodiment, detailed descriptions of dividing the scaled test image 215 into a plurality of test sub-images 230 using an algorithm such as the sliding window algorithm are omitted.

Detailed descriptions of scaling the test image are disclosed below.

Firstly, the situation that the test camera parameter for photographing the test image is identical to the training camera parameter in the training database is considered. If the training distance in the training database is d and the test distance is d', then the scaling is as follows: the length of the scaled test image=the length of the test image×(d'/d); the width of the scaled test image=the width of the test image×(d'/d).

Then, the situation that the training distance in the training database is identical to the test distance (d'=d) for photographing the test image but the test camera parameter is different from the training camera parameter is considered. Under such circumstance, the magnification power of the camera lens is considered. For example, the magnification power of the camera lens being 1:1 implies that the object and the image have the same size, and the magnification power of the camera lens being 1:0.5 implies that the object is imaged at a half size (that is, the size of the image is a half of the size of the object). Let the photographing of a coin having a diameter of 2.0 cm be taken for example. If the magnification power of the camera lens is 1:1 (that is, the magnification power is 1), then the obtained image is a coin having a diameter of 2.0 cm. If the magnification power of the camera lens is 1:0.5 (that is, the magnification power is 2), then the obtained image is a coin having a diameter of 1.0 cm.

Therefore, the actual size of the object can be obtained from the adjustment equation: the actual size of the object=the obtained image×(1/the magnification power). If the magnification power of the camera lens is 1:0.5 (that is, the magnification power is 2), then the obtained image is a coin having a diameter of 1.0 cm. Therefore, based on the adjustment equation: 1.0×(1/0.5)=2.0 (cm), the photographed object is a coin having a diameter of 2.0 cm.

Suppose that the magnification power of the lens of the training camera is p and the magnification power of the lens of the test camera is p', the scaling can be expressed as follows: the length of the scaled test image=the length of the test image×(p/p'); the width of the scaled test image=the width of the test image×(p/p').

If (1) the test camera parameter for photographing the test image is different from the training camera parameter in the training database and (2) the training distance is different from the test distance, then the magnification power p' by which the test distance d' corresponds to the test camera parameter is calculated and the image is scaled according to the magnification power p'. That is, the length of the scaled test image=the length of the test image×(p/p'); the width of the scaled test image=the width of the test image×(p/p'). The above equations are explained using the following examples. Suppose that a test image is obtained by a camera having a focal length f' at a photographing distance qq'. Based on the thin lens imaging formula, (1/pp')+(1/qq')=1/f', the imaging distance pp' of the camera can be calculated from f' and qq', and the magnification power p' can be calculated from |qq'/pp"|. By the same analogy, a training image in the database is obtained by photographing an object using a camera having a focal length f at a photographing distance qq. Based on the thin lens imaging formula, (1/pp)+(1/qq)=1/f, the imaging distance pp of the camera can be calculated from f and qq, and the magnification power p is |qq/pp|. By substituting p and p' to the above equations, image adjustment (back calculation) can be obtained (that is, the length of the scaled test image=the length of the test image×(p/p'); the width of the scaled test image=the width of the test image×(p/p')).

Second Embodiment

Figure 3:
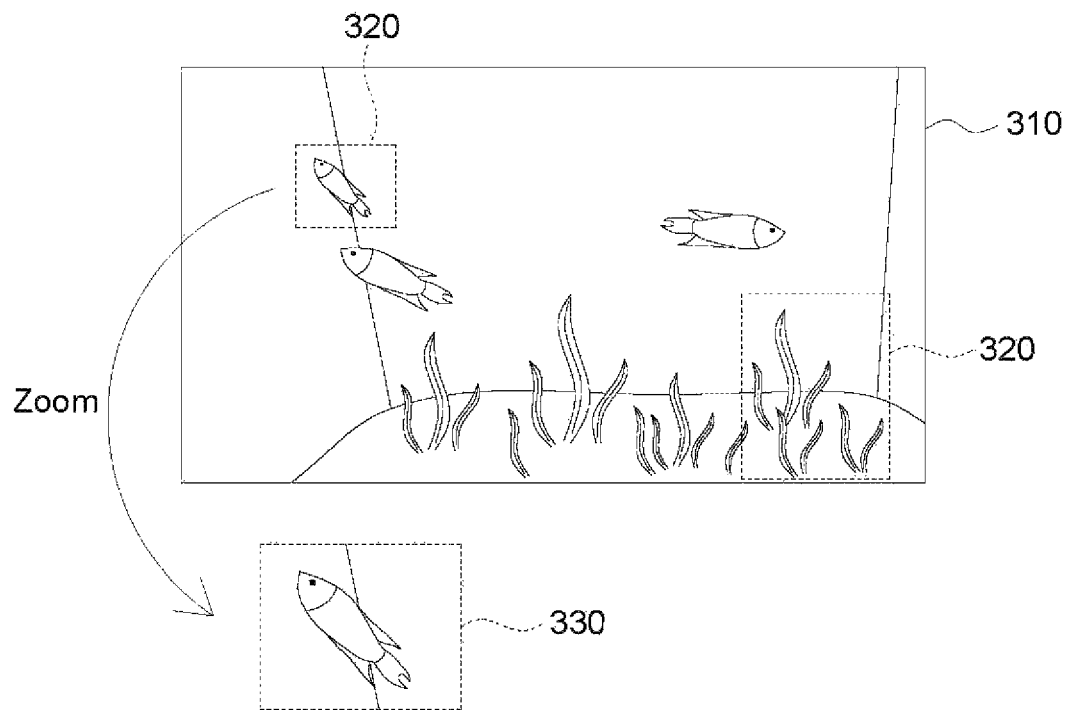
FIG. 3 is a schematic diagram of object identification according to a second embodiment of the present disclosure.

In the second embodiment of the present disclosure as indicated in FIG. 3, a plurality of candidate regions 320 including object features may be generated from the test image 310 using an algorithm such as the selective search algorithm. However, the present disclosure is not limited thereto. In other possible embodiments of the present disclosure, a plurality of candidate regions may be generated from the test image using other possible algorithms, and these possible embodiments are still within the spirit of the present disclosure.

After the candidate regions 320 are generated, the candidate regions 320 are individually scaled as scaled candidate regions 330" with reference to the average distance (that is, the average depth of all objects) of all objects within each candidate region 320. Then, object detection/identification is performed on the scaled candidate regions 330.

Detailed descriptions of scaling the candidate regions 320 as the scaled candidate regions 330 according to the second embodiment are disclosed below. In the second embodiment, the candidate regions 320 and the scaled candidate regions 330 are exemplified by squares, but the present disclosure is not limited thereto.

The determination of scaling in the second embodiment of the present disclosure is similar to that in the first embodiment. In the second embodiment of the present disclosure, the length of the scaled candidate regions 330=the length of the candidate regions 320×(d'/d)×(p/p'); the width of the scaled candidate regions 330=the width of the candidate regions 320×(d'/d)×(p/p').

Figure 4:
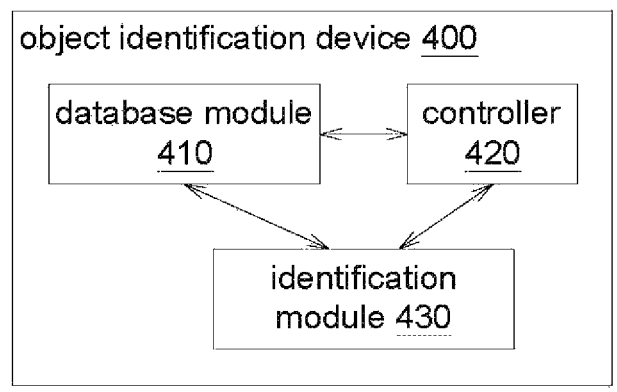
FIG. 4 is a functional block diagram of an object identification device according to an embodiment of the present disclosure.

FIG. 4 is a functional block diagram of an object identification device according to an embodiment of the present disclosure. As indicated in FIG. 4, the object identification device 400 includes a database module 410, a controller 420 and an identification module 430.

The database module 410 is configured to establish a training database including a photographing distance of a training image and a training camera parameter. The photographing distance of the training image refers to the distance from the training object to the training camera (this parameter may be obtained from the depth parameter of the training image). The training image refers to the image obtained by photographing the training object using the training camera. The training camera parameter refers to the camera parameter used for photographing the training image. The training camera parameter includes any combinations of focal length parameter, magnification power, and camera resolution.

During the photographing of a target test object, the controller 420 obtains a test image, a depth image, an RGB image, and a test camera parameter. The depth image includes a depth information of the target test object. The RGB image includes the R/G/B gray scale value of each pixel of the image of the target test object photographed using the test camera. The test camera parameter refers to the parameter of the test camera used for photographing the target test object. Similarly, the test camera parameter includes any combinations of focal length parameter, magnification power, and camera resolution.

The identification module 430 adjusts the RGB image according to the training database, the depth image, and the test camera parameter, such that the adjusted RGB image has a size equivalent to that of a relevant training image in the training database.

According to the above embodiments of the present disclosure, the actual object distance is adjusted (that is, according to relevant photographing distance and test distance), such that the test sub-image and the candidate regions can have a size close to or identical to that of the training image, and the object identification rate can be increased. In the above embodiments of the present disclosure, since object identification is not performed by way of simulation, there is no need to establish a large database, and no simulation problem will occur (for example, the test distance is not simulated).

Thus, in the above embodiments of the present disclosure, the object identification rate can be increased without establishing a large database. Therefore, the above embodiments of the present disclosure can dispense with the establishment of a large database. Since object identification is not performed by way of simulation, identification accuracy can be increased.

In the embodiments of the present disclosure, the computer is not merely used as a tool but is configured to generate special technical effects (for example, the computer performs object identification through image adjustment). That is, the computer further improves object identification for specific patterns (according to the camera parameter and the photographing distance or the test distance, such that the test sub-image/the candidate regions can have a size close to that of the training image).

The above embodiments of the present disclosure are specifically but not restrictively directed towards the object identification rate of a computer identification system. The conventional computer identification system which is trained by a small volume of data is unable to achieve a high object identification rate. The computer identification system of the embodiments of the present disclosure obtains the training image from the back calculation of the test sub-image/the candidate regions of the object rather than through simulation. That is, the size of the object image within the test sub-image/the candidate regions is similar to that of the training image in the database.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An object identification method, comprising:
   establishing a training database comprising a photographing distance of a training image and a training camera parameter;
   obtaining a test image, a depth image, an RGB image, and a test camera parameter during the photographing of a target test object, wherein the RGB image includes the R/G/B gray scale value of each pixel of the target test object;
   adjusting the RGB image according to the training database, the depth image, and the test camera parameter, such that the adjusted RGB image has a size equivalent to that of the training image in the training database;
   wherein
   the scaling of the test image is determined according to the photographing distance of the training image, a photographing distance of the target test object, the training camera parameter, and the test camera parameter;
   a plurality of candidate regions comprising a plurality of object features are generated from the test image;
   each candidate region is scaled individually with reference to the average distance of all objects within each candidate region, wherein each scaled candidate region has a size equivalent to that of the training image; and
   object identification is performed on each scaled candidate region.

2. The object identification method according to claim 1, wherein, the training camera parameter comprises any combinations of focal length parameter, magnification power, and camera resolution.

3. The object identification method according to claim 1, further comprising:
   dividing the scaled test image into a plurality of test sub-images each having a size equivalent to that of the training image; and
   performing object identification on the test sub-images.

4. An object identification device, comprising:
   a database module configured to establish a training database comprising a photographing distance of a training image and a training camera parameter;
   a controller configured to obtain a test image, a depth image, an RGB image, and a test camera parameter during the photographing of a target test object, wherein the RGB image includes the R/G/B gray scale value of each pixel of the target test object; and an identification module configured to adjust the RGB image according to the training database, the depth image, and the test camera parameter, the identification module, such that the adjusted RGB image has a size equivalent to that of the training image in the training database;

wherein, the controller is configured to
determine the scaling of the test image according to the photographing distance of the training image, a photographing distance of the target test object, the training camera parameter, and the test camera parameter;

generate a plurality of candidate regions comprising a plurality of object features from the test image;

scale each candidate region individually with reference to the average distance of all objects within each candidate region, wherein each scaled candidate region has a size equivalent to that of the training image; and perform object identification on each scaled candidate region.

5. The object identification device according to claim 4, wherein, the training camera parameter comprises any combinations of focal length parameter, magnification power, and camera resolution.

6. The object identification device according to claim 4, wherein, the controller is configured to:

divide the scaled test image into a plurality of test sub-images each having a size equivalent to that of the training image; and perform object identification on the test sub-images.

* * * * *